US005737515A

United States Patent [19]
Matena

[11] Patent Number: 5,737,515
[45] Date of Patent: Apr. 7, 1998

[54] METHOD AND MECHANISM FOR GUARANTEEING TIMELINESS OF PROGRAMS

[75] Inventor: Vladimir Matena, Redwood City, Calif.

[73] Assignee: Sun Microsystems, Inc., Mountain View, Calif.

[21] Appl. No.: 669,722

[22] Filed: Jun. 27, 1996

[51] Int. Cl.[6] ................................................. G06F 11/00
[52] U.S. Cl. ........................ 395/182.21; 395/185.08; 364/267.9
[58] Field of Search .................... 395/182.21, 185.04, 395/185.08; 364/267.9; 371/61

[56] References Cited

U.S. PATENT DOCUMENTS

| | | | |
|---|---|---|---|
| 4,538,273 | 8/1985 | Lasser | 395/182.21 |
| 4,594,685 | 6/1986 | Owens | 395/182.21 |
| 4,618,953 | 10/1986 | Daniels et al. | 395/182.21 |
| 5,233,613 | 8/1993 | Allen et al. | 395/182.21 |
| 5,287,362 | 2/1994 | Liencres | 395/185.08 |
| 5,333,285 | 7/1994 | Drerup | 395/182.21 |
| 5,388,254 | 2/1995 | Betz et al. | 395/575 |
| 5,390,326 | 2/1995 | Shah | 395/185.08 |
| 5,396,613 | 3/1995 | Hollaar | 395/185.08 |
| 5,440,725 | 8/1995 | Weller et al. | 395/185.08 |
| 5,513,319 | 4/1996 | Finch et al. | 395/185.08 |
| 5,560,033 | 9/1996 | Doherty et al. | 395/185.04 |
| 5,583,987 | 12/1996 | Kobayashi et al. | 395/182.21 |
| 5,594,865 | 1/1997 | Saitoh | 395/185.08 |

*Primary Examiner*—Phung Chung
*Assistant Examiner*—Scott T. Baderman
*Attorney, Agent, or Firm*—Blakely Sokoloff Taylor & Zafman

[57] ABSTRACT

In order to prevent data corruption and inconsistency caused by incorrect assumption regarding a presumably failed node and/or program, a fail-fast timer mechanism enforces deadlines, i.e. enforces timeliness in programs. For example, given a program which needs to ensure a given code segment is executed within a specified deadline, the program arms a fail-fast timer before executing the code segment. After completing the execution of the code segment, the program disarms the fail-fast timer. If the program executes too slowly and the fail-fast timer expires before the fail-fast timer has been disarmed, the entire node is forced to stop very quickly (i.e. the node fails fast). The fail-fast timer of the present invention also triggers if the program exits before disarming a previously armed timeout.

17 Claims, 5 Drawing Sheets

```
module ff {
    //
    //The timer interface is used to set up and cancel a failfast
    //timeout. A failure to disarm or re-arm a timeout will cause
    //the node to abort.
    //
    interface timer {
            void arm (in long timeout);
            void disarm ();
    };

//
    //The 'timer_mngr' interface is a factory of timer objects.
    //
    interface timer_mngr {
            timer get_timer ();
    };
};
```
⎬ 500

*Figure 5*

```
monitor 1 ()
{
        ff::timer ff = get_timer ();            //obtain a failfast timer loop {
                ff->arm (2000);                 //arm timer for 2 seconds
                check_file_server 1 ()          //check the well-being of file server 1
                send_heart_beat ();             //send message to monitor 2
                sleep (1);                      //sleep for 1 second
        }
        ff->disarm ();
}
```
⎬ 218

*Figure 6*

METHOD AND MECHANISM FOR GUARANTEEING TIMELINESS OF PROGRAMS

BACKGROUND OF THE INVENTION

(1) Field of the Invention

The present invention is related to the field of reliable distributed systems also known as systems for "high availability" (HA systems). More specifically, the present invention is related to a method and apparatus for a fail-fast timer mechanism guaranteeing that programs execute a given operation within a pre-determined time or fail prior to a back-up program taking over for the failed program. A program failing before a back-up program takes over prevents more than one program from outputting data in response to a single data request.

(2) Prior Art

A distributed system, also known as systems for "high availability" (HA systems), comprises multiple nodes (where a node is a computer) connected through a network. A network is sometimes referred to as an interconnect or interconnect network. In a "high availability" system (HA system), if one program fails or if a node on which the programs run fails, other programs or nodes become unable to communicate with the failed program or node, but otherwise continue being executed. Communication attempted by a node to a failed program or node results in a timeout.

A disadvantage of current HA systems is their poor ability to differentiate between a program which has failed from a program which is executing very slowly. A program may execute very slowly because the node on which the program runs is overloaded. If a program attempts to communicate with a slowly executing program running on another node, the communication times out (i.e. the communication is interrupted). Additionally, the program attempting communication incorrectly assumes that the latter program has crashed.

The ability to differentiate between a crashed program and a program running slowly is important in an HA system. For example, in an HA system, programs running on one or more nodes monitor each other. If a program in such a HA system crashes, the programs running on the remaining nodes in the HA system perform recovery steps on behalf of the failed program. If the presumably crashed program was still running during or after the recovery, the distributed system loses data consistency and data is corrupted. The data corruption and loss of data consistency is caused by data being output from two different nodes in response to a single data request, namely data is output from both the node which presumably crashed and the node which performs the recovery steps. The programs requesting data assume that they are receiving the data from one source. Since the data output by the two nodes are not synchronized, two different values may be output in response to a request for one value thereby causing unpredictable results.

FIG. 1 illustrates an exemplary HA system. HA system 100 consists of node 102 and node 104. Node 102 is running a program referred to as "file server" 106. File server 106 mediates access to data located in a file system on disk 108. For example, a program referred to as client 110 accesses the data over a local area network (LAN) 112 through the file server program 106. To tolerate a crash of node 102, node 104 also runs a copy of a file server program 114. File server program 114 is configured to be a "hot stand-by" of file server 106, i.e. if file server program 106 crashes, file server program 114 will be automatically enabled to assume file server program 106's function. The automatic enabling of file server program 114 may be performed through monitoring of file server program 106 by monitor 118 as described below.

A program referred to here as monitor 118 runs on node 102. Monitor program 118 wakes up periodically to check the well being of file server program 106 and transmits a heartbeat message to monitor program 120 running on node 104 to notify monitor program 120 of the well being of file server program 106. Monitor program 120 expects to receive the periodic heartbeat messages. If monitor program 120 fails to receive the heartbeat messages within a specific timeout, monitor program 120 assumes that file server program 106 is dead and will enable file server program 114.

If file server program 106 or monitor 118 are executing very slowly because node 102 is overloaded, monitor program 120 may not receive the heartbeat messages fast enough and monitor program 120 may make an incorrect decision that node 102 is inaccessible. Such a situation leads to data corruption because both file server program 106 and file server program 114 access the data on disk concurrently without any synchronization. Additionally, HA system 100 loses its external integrity because both file server program 106 and file server program 114 will attempt to service client requests and the replies from the two file server programs may not be consistent.

Therefore, it is desirable to have a method and an apparatus which prevents corruption of data due to incorrect assumption by a node or a program in a distributed system that another program or node has crashed.

BRIEF SUMMARY OF THE INVENTION

A method and an apparatus are disclosed for preventing data corruption in a distributed system caused by an incorrect assumption by a node or a program in the distributed system that another node or a program has crashed.

If a given node or program incorrectly assumes that another node or program has crashed, both nodes or programs (i.e. the node/program which has presumably "crashed" and the node/program which takes over for the presumably "crashed" node/program) may transmit data of their own without knowledge that the other is also simultaneously transmitting data. Such data from the two nodes or programs may be inconsistent which may lead to the corruption of data. In order to prevent data corruption and inconsistency caused by an incorrect assumption regarding a presumably failed node and/or program, a fail-fast timer mechanism of the present invention enforces program execution deadlines, i.e. a program must complete execution of an operation within a pre-determined time or the program is forced to fail.

For example, given a program which needs to ensure a given code segment is executed within a specified deadline, the program arms a fail-fast timer before executing the code segment. After completing the execution of the code segment, the program may disarm the fail-fast timer. If the program executes too slowly and the fail-fast timer expires before the fail-fast timer has been disarmed, the entire node is forced to stop very quickly (i.e. the node fails fast). The fail-fast timer of the present invention also triggers if the program exits before disarming a previously armed timeout. By ensuring that a given node or program fails fast in a specified period of time, the present invention guarantees that only one node or program will respond to requests for data by another program.

A reliable fail-fast timer of the present invention may be implemented by an operating system (OS) kernel and some hardware support. There are many advantages of the present invention, for example, the present invention's fail-fast timer mechanism can be implemented using off the shelf hardware and operating system. Additionally, the present invention's fail-fast timer mechanism can be applied to prevailing open systems, such as existing personal computers (PC's), work stations and servers. Further, the fail-fast timer mechanism is very simple. It is therefore easy to achieve a reliable implementation of the fail-fast timer mechanism. The fail-fast timer application program interface (API) provides independence from underlying implementation. Finally, multiple logical fail-fast timers can be supported on a single node.

BRIEF DESCRIPTION OF THE DRAWINGS

FIG. 5 illustrates an exemplary fail-fast timer application programming interface (API).

FIG. 6 illustrates an exemplary monitor program.

DETAILED DESCRIPTION OF THE INVENTION

A method and an apparatus for preventing data corruption in a distributed system caused by one or more nodes or programs in the distributed system incorrectly assuming that another node or program has crashed.

Figure 1:
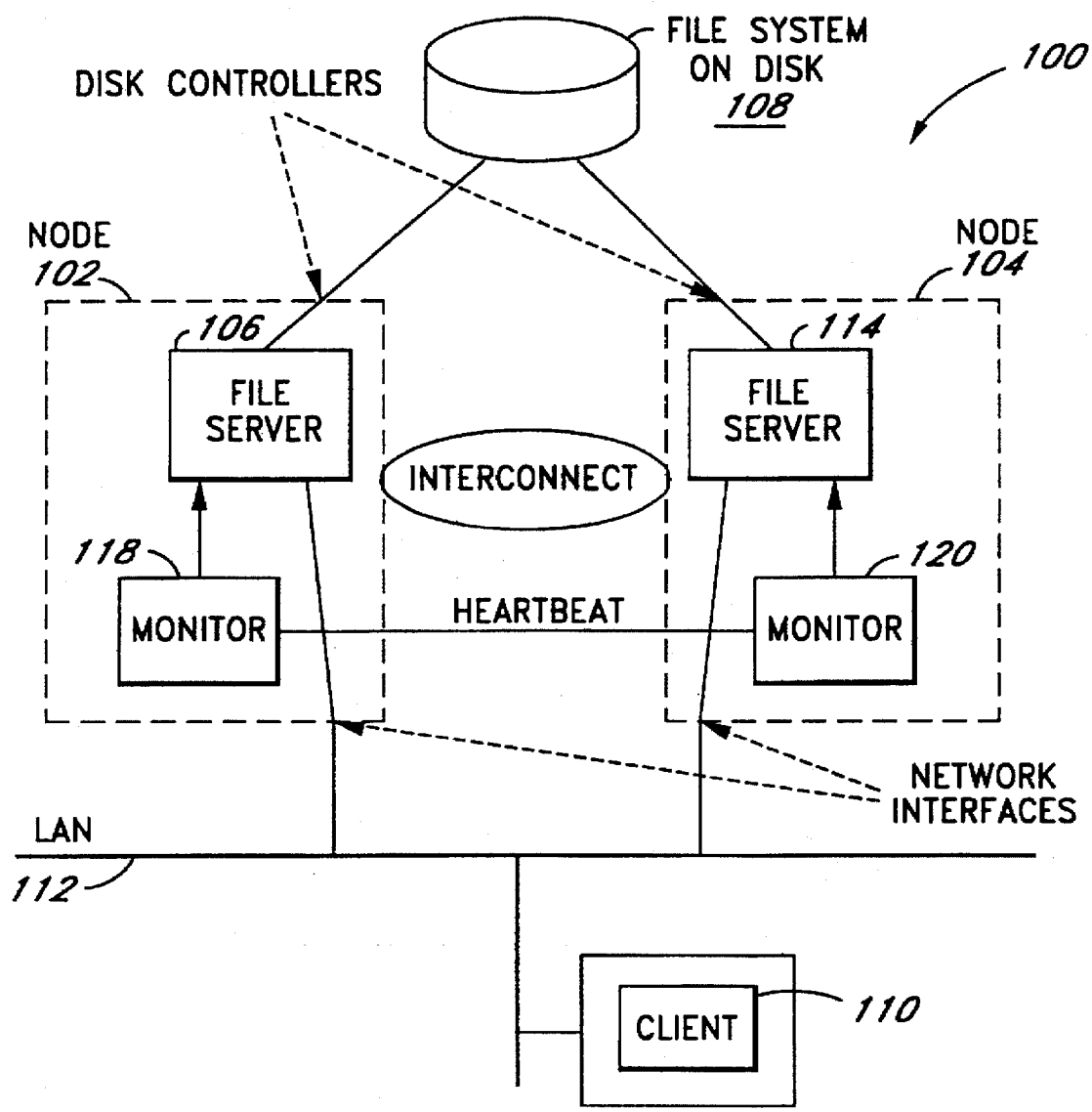
FIG. 1 illustrates an exemplary prior art high availability (HA) system.
Figure 2:
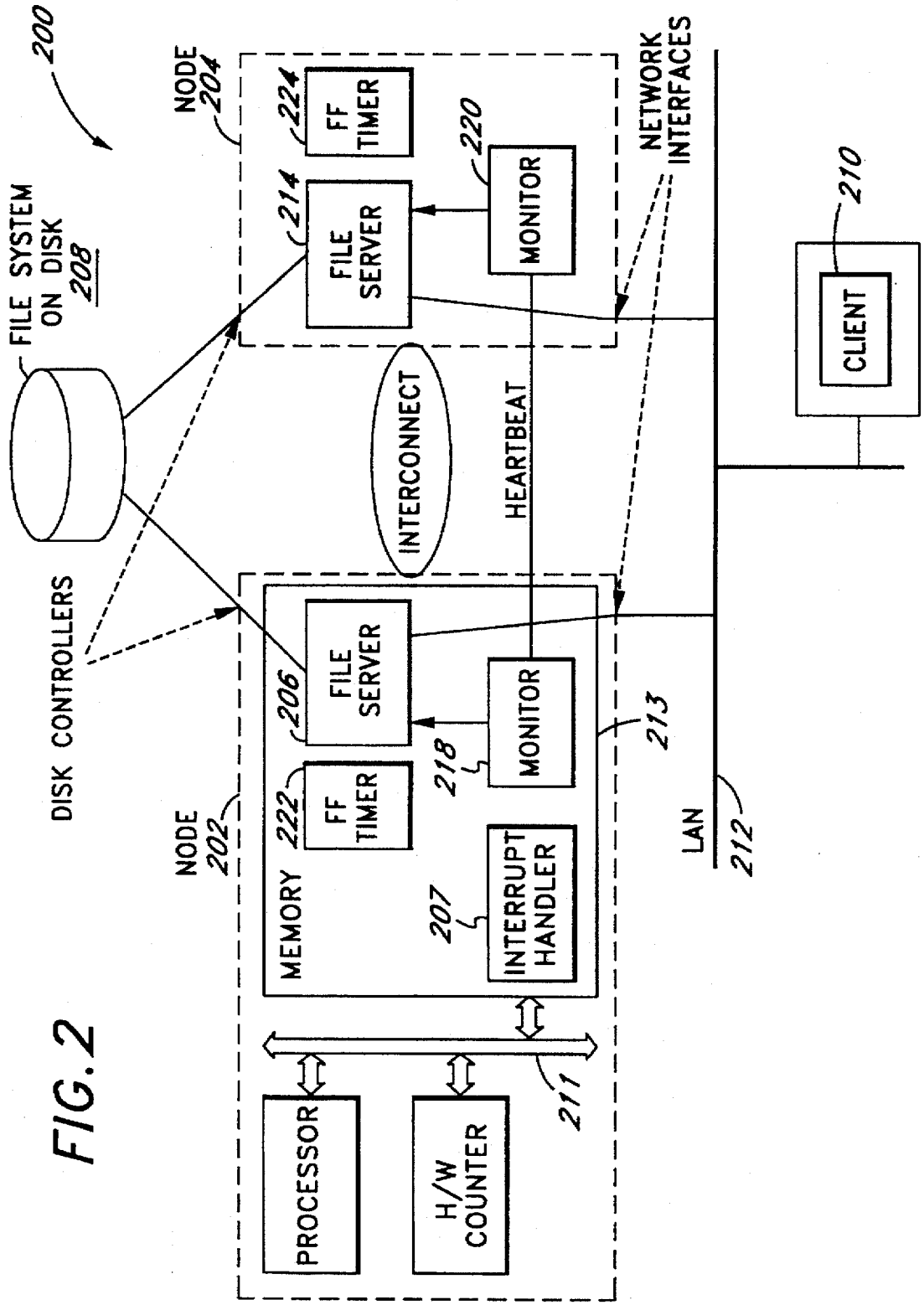
FIG. 2 illustrates an exemplary high availability (HA) system with the fail-fast timer mechanism of the present invention.

FIG. 2 illustrates an exemplary high availability (HA) system with the fail-fast timer mechanism of the present invention. Distributed system 200 has nodes 202 and 204. Node 202 has a processor 209, a bus 211, a storage device 213 coupled to processor 209 through bus 211, an interrupt handler 207 and a hardware counter 209 coupled to storage device 213 through bus 211. Although not shown, node 204 also has a processor, a bus, a storage device, an interrupt handler and a hardware counter.

Each node also has a file server (206 and 214 respectively) which is a high-capacity disk storage device that each computer on a network can use to access and retrieve files that can be shared among the attached computer. Further, each node has a monitor program (218 and 220 respectively) for monitoring a node to ensure that they are executing and executing at a minimum speed which assures that a given program will complete execution of a time critical task within an allotted time frame. Additionally, each node has a fail-fast timer mechanism of the present invention (222 and 224 respectively).

If a given node (or a program) incorrectly assumes that another node has crashed, both nodes may transmit data of their own without knowledge that the other is also simultaneously transmitting data. Such data from the two nodes may be inconsistent which may lead to data corruption.

In order to prevent data corruption and inconsistency caused by incorrect assumptions regarding a presumably failed node and/or program, the fail-fast timer mechanism of the present invention enforces deadlines, i.e. enforces timeliness in programs. For example, given a program which needs to ensure a given code segment is executed within a specified time frame, the program arms a fail-fast timer before executing the code segment. After completing the execution of the code segment, the program disarms the fail-fast timer. If the program executes too slowly and the fail-fast timer expires before the fail-fast timer has been disarmed, the entire node is forced to stop very quickly (i.e. the node fails fast). The faol-fast timer of the present invention also triggers if the program exits before disarming a previously armed timeout.

A reliable fail-fast timer of the present invention may be implemented by an operating system (OS) kernel and some hardware support. There are many advantages of the present invention, for example, the present invention's fail-fast timer mechanism can be implemented using off the shelf hardware and operating systems. Additionally, the present invention's fail-fast timer mechanism can be applied to prevailing open systems, such as existing personal computers (PC's), work stations and servers. Further, the fail-fast timer mechanism is very simple and therefore easy to achieve a reliable implementation, and the fail-fast timer application program interface (API) provides independence from underlying implementation details. Finally, multiple fail-fast timers can be supported on a node.

Figure 3:
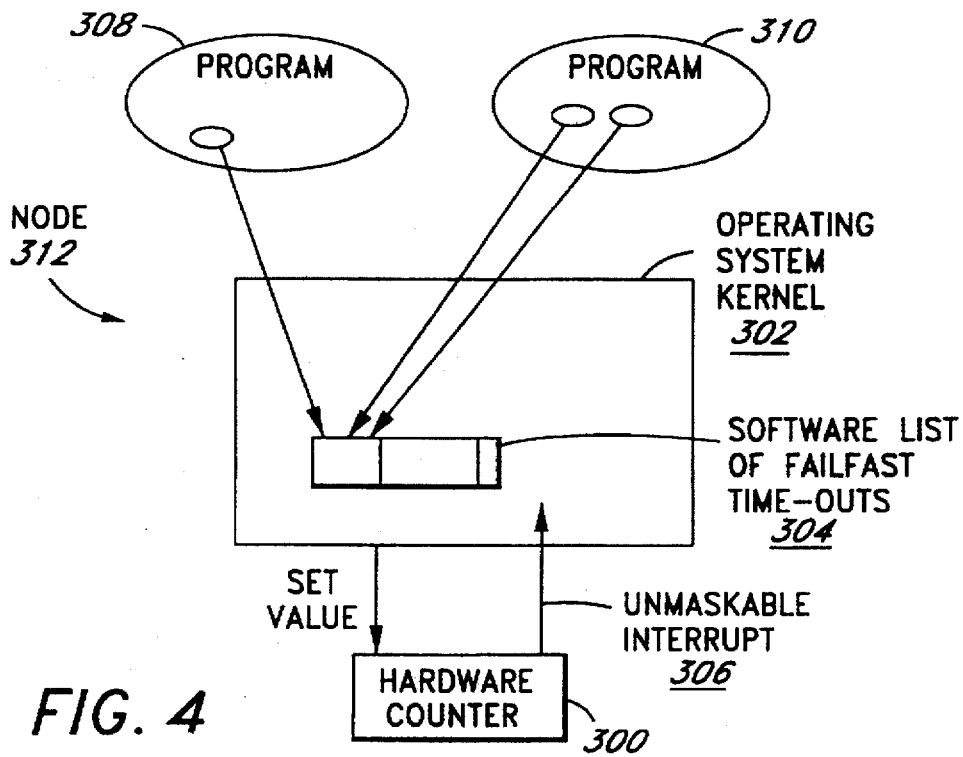
FIG. 3 illustrates an exemplary embodiment of the present invention's fail-fast timer mechanism.

FIG. 3 illustrates an exemplary embodiment of the present invention's fail-fast timer mechanism. The implementation illustrated in FIG. 3 uses a single hardware counter. A counter present in most of today's computer systems may be implemented with the present invention. Hardware counter 300 is a device which operating system 302 loads with a value representing a time interval within which a given task is to be completed. Once the value is loaded, hardware counter 300 counts down (i.e. decrements the value) for example each microsecond. When hardware counter 300 reaches 0, hardware counter 300 generates an interrupt 306. An interrupt is an instruction that directs a microprocessor to suspend what it is doing and run a specified routine. When the routine is complete, the microprocessor resumes its original work. The present invention is arranged so that interrupt 306 cannot be masked by operating system 302 and that interrupt handler 207 resets the node by sending a signal to a hardware reset mechanism of node 312 which instantly kills all programs, including programs 308 and 310, running on node 312 and resets all the hardware devices attached to node 312. An interrupt handler is a routine that receives control of the system as a result of a hardware interrupt. To implement this reset function, a person skilled in the art may use existing hardware reset mechanisms (such as used to reset a computer when the computer is turned off and then turned back on) in computers to implement the resetting operation of the present invention given the detail description of the invention disclosed herein.

In order to create the illusion of multiple fail-fast timers, operating system 302 manages a software list 304 of fail-fast timeouts. A timeout is a time interval allotted for certain time critical operations to occur. At any point in time, the smallest value of all the software timeouts in software list 304 is loaded into hardware counter 300. Techniques for managing a software timeout list by persons skilled in operating system design are considered well known.

Figure 4:
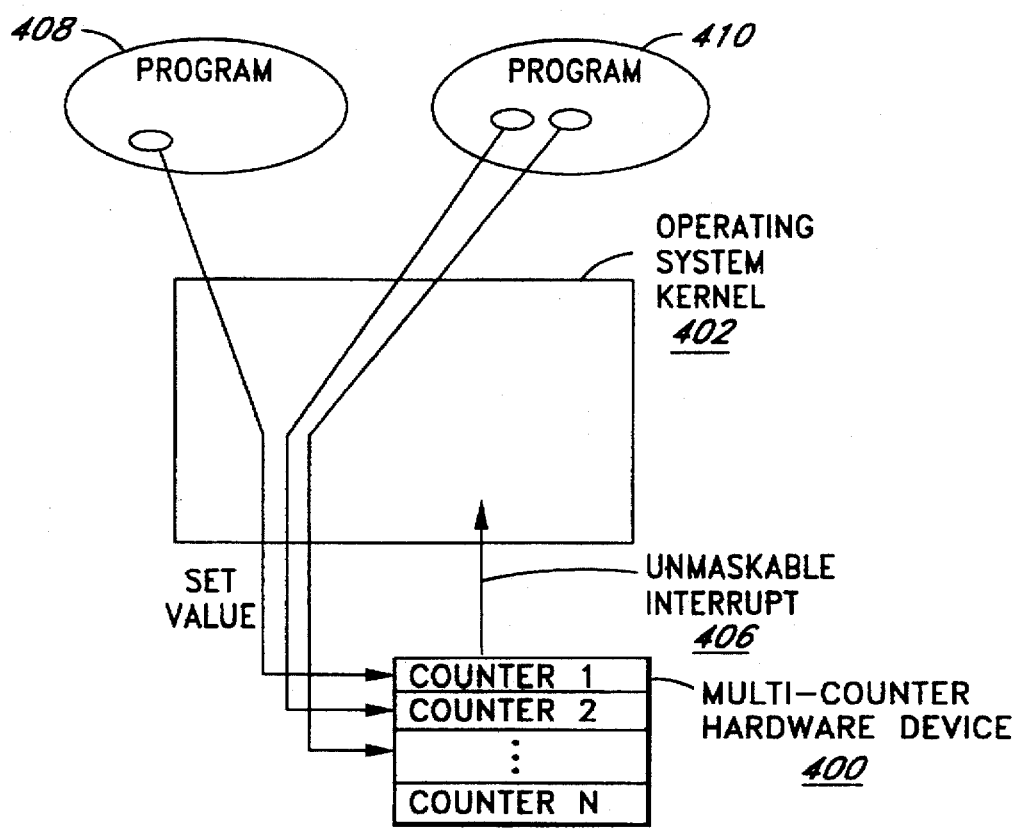
FIG. 4 illustrates an alternate embodiment of the present invention.

FIG. 4 illustrates an alternate embodiment of the present invention. The alternate embodiment can be achieved by using a hardware device with multiple counters. When a program (408 or 410) requests a fail-fast timer, operating system 402 assigns an unused hardware counter 400 to the program. The program then arms hardware counter 400 with a timeout value. When the program no longer needs the fail-fast timer, hardware counter 400 is returned to the pool of free counters contained by operating system 402. If any of the hardware counters reaches 0, the hardware device generates interrupt 406 that kills the entire node as was described in the text accompanying FIG. 3.

FIG. 5 illustrates an exemplary fail-fast timer application programming interface (API). Exemplary fail-fast timer API 500 is illustrated using the standard CORBA IDL (Common Object Request Broker Architecture Interface Definitions Language) language. The IDL (Interface Definitions Language) API described is a preferred embodiment of the present invention. Fail-fast timer API 500 uses a get-timer procedure and a timer manager interface to obtain a fail-fast timer. A timer manager is a part of the operating system. Programs use the timer manager to obtain a reference to a fail-fast timer.

The arm procedure arms a fail-fast timer with a timeout value in milliseconds. The disarm procedure disarms an existing fail-fast timer. If the arm procedure is applied to a previously armed timer, the old timeout value is replaced with a new value in a single atomic operation. A more detailed description of the arm and disarm procedure is illustrated in FIG. 7 and the accompanying text.

FIG. 6 illustrates an exemplary monitor program. References will be made to the elements illustrated in FIG. 2. The illustrated monitor program 600 guarantees that monitor 218 will send a heartbeat message at least each two seconds if node 202 is alive. If node 202 becomes overloaded and monitor program 218 is not able to perform the code fragment in the loop, the fail-fast timer mechanism will kill node 102. This guarantee is as reliable as the hardware mechanism which implements the hardware counter previously illustrated.

The exemplary monitor program illustrated in FIG. 6 handles most unexpected failures which would result in not meeting the two second deadline. Examples of such unexpected failures include when file server 206 is executing too slowly, when monitor program 118 is executing too slowly, when monitor program 118 crashes or when monitor 218 cannot communicate with file server program 206.

Figure 7:
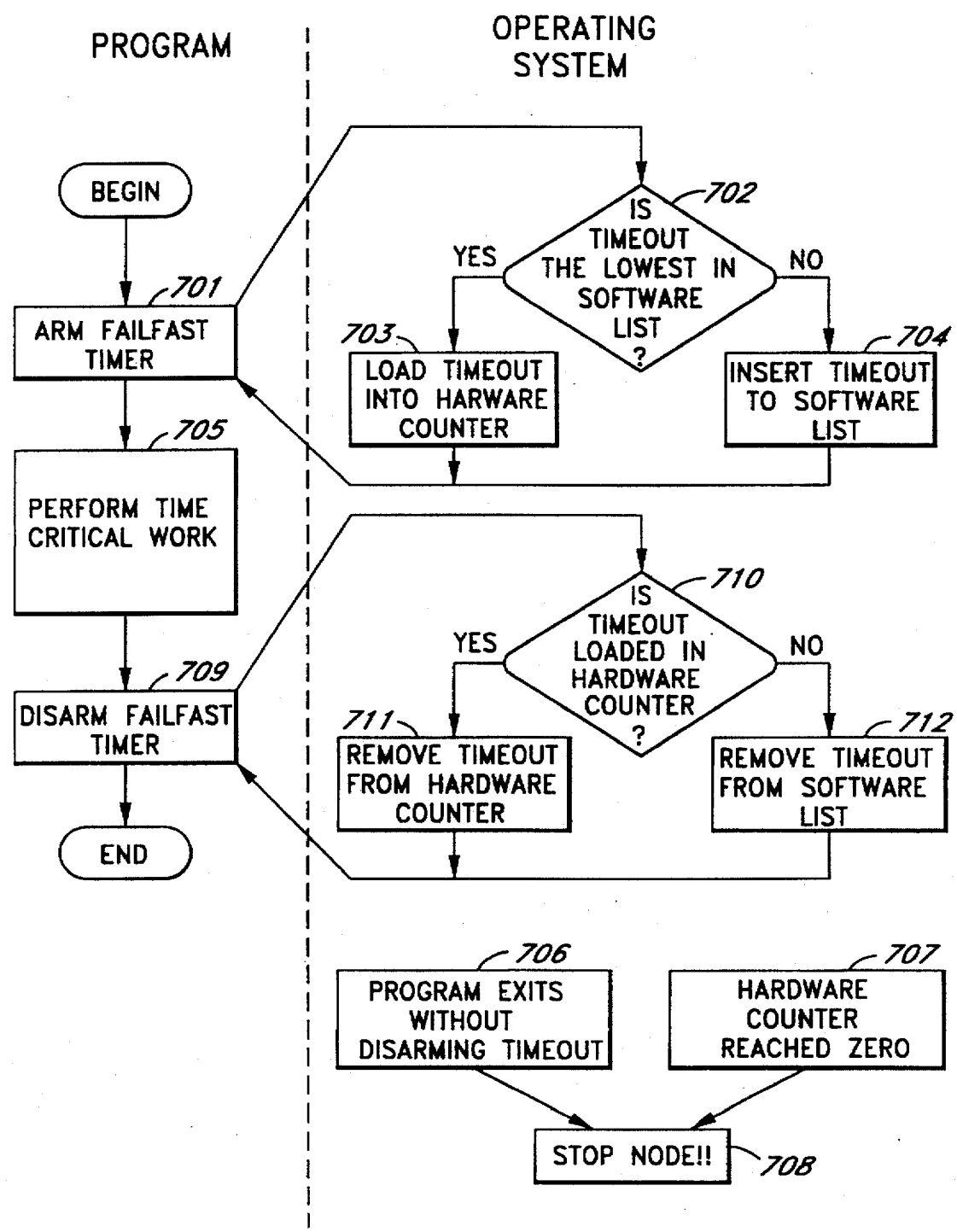
FIG. 7 is a flow diagram illustrating the general steps followed by the fail-fast timer mechanism of the present invention.

FIG. 7 is a flow diagram illustrating the general steps followed in arming and disarming the fail-fast timer mechanism of the present invention. In step 701, a program requests to arm a fail-fast timer and provides a timeout value to the fail-fast timer mechanism. In step 702, it is determined whether the timeout value provided by the program is the lowest value in a software list of timeout values. In step 703, if the timeout value is the lowest, then it is loaded into a hardware counter assigned to the program. Otherwise, in step 704, the timeout value is inserted into the software list of timeout values and the lowest timeout value in the software list is loaded into the hardware counter.

In step 705, time critical operations of the program are performed and the hardware counter begins counting down using the loaded timeout value. In step 706, if the program exits without disarming the fail-fast timer, or in step 707, if the hardware counter reaches zero, then in step 708, the node on which the program is running stops (i.e. fails fast).

In step 709, the time critical operations have completed execution and the program requests the fail-fast timer mechanism to disarm the fail-fast timer. In step 710, if the timeout value originally provided by the program is in the hardware counter, then in step 711, the timeout value is removed from the hardware counter. Otherwise, in step 712, the timeout value originally provided by the program is removed from the software list of timeout values.

What has been described is a reliable fail-fast timer mechanism for preventing data corruption in a distributed system having two or more systems (nodes) communicating with each other.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for a fail-fast timer for a plurality of programs, each associated with a timeout value and each running a time critical operation on a node, comprising the steps of:

arming a fail-fast timer mechanism by loading the smallest timeout value associated with one of said plurality of programs from a software list of a plurality of timeout values into a hardware counter, said smallest timeout value being smaller than or equal to the timeout value associated with any one of the other said plurality of programs;

resetting said one of a plurality of programs if the time critical operation associated with said one of a plurality of programs does not complete execution within said smallest timeout value; and disarming said fail-fast timer mechanism for said one of a plurality of programs once said time critical operation has been completed and loading the smallest timeout value associated with one of the other of said plurality of programs.

2. The method of claim 1 wherein said step of arming said fail-fast timer mechanism comprises the step of determining the smallest timeout value of said software list of timeout values.

3. The method of claim 2 further comprising the steps of:

inserting said timeout values associated with the said plurality of programs which are not the smallest in said software list of timeout values; and loading the smallest timeout value from said software list of timeout values into said hardware counter.

4. The method of claim 1 wherein said step of disarming further comprises the step of determining if said smallest timeout value is loaded in said hardware counter.

5. The method of claim 4 further comprising the step of removing said smallest timeout value from said hardware counter.

6. The method of claim 4 further comprising the step of removing said smallest timeout value from said software list of timeout values if said smallest timeout value is not loaded in said hardware counter.

7. The method of claim 1 further comprising the step of resetting the node if the program exits without disarming said fail-fast timer mechanism.

8. The method of claim 1 further comprising the step of resetting the node if said hardware counter reaches zero before it has been disarmed or rearmed.

9. In a computer system including a plurality of nodes which are adapted to communicate with each other, predetermined ones of said nodes having a fail-fast timer mechanism and at least one module which performs time critical operations, said fail fast timer mechanism comprising:

a fail-fast computer program which is executed by a processor, said program performing arming and disarming operations when requested by one of said at least one module, wherein said arming operation generates a timeout value which is stored in a memory;

a counter coupled to said memory which is loaded with the smallest said timeout value associated with one of said at least one module from a software list of a plurality of timeout values, said smallest timeout value being smaller than or equal to the timeout value associated with any one of the other said at least one module, said counter adapted to decrement at a predetermined interval and generating an interrupt signal if said one of at least one module fails to execute within said smallest timeout value, said counter loaded with the smallest timeout value associated with one of the other of said at least one module if said one of at least one module executes within said smallest timeout value; and an interrupt handler coupled to said processor for generating a reset signal when said interrupt signal is generated.

10. The apparatus of claim 9 wherein said counter comprises a hardware counter configured to decrement said smallest timeout value, said hardware counter in communication with said fail fast computer program to indicate when said smallest timeout value is decremented to zero, said interrupt handler generating a reset signal when said smallest timeout value is decremented to zero, said hardware counter coupled to said memory.

11. The apparatus of claim 9 wherein said counter comprises a multi-counter hardware device coupled to said memory, said multi-counter hardware device containing multiple hardware counters, each unused said hardware counter assigned to the at least one module capable of arming said fail-fast timer mechanism.

12. The apparatus of claim 9 comprising a first monitor module of a first node configured to enable transmission of a heart beat message to a second monitor module of a second node to indicate that said first node is active, said second node capable of replacing said first node if said heart beat message is no longer received by said second node, said heart beat message no longer being received by said second node when said fail fast timer mechanism resets said first node.

13. A computer system being one of a plurality of computers which are adapted to communicate with each other, the system comprising:

a memory having,
    at least one module which performs time critical operations, and
    a fail-fast computer program, said program performing arming and disarming operations when requested by said at least one module, wherein said arming operation generates a timeout value which is stored in said memory;

a counter coupled to said memory which is loaded with the smallest said timeout value associated with one of said at least one module from a software list of a plurality of timeout values, said smallest timeout value being smaller than or equal to the timeout value corresponding to any one of the other said at least one module, said counter adapted to decrement at a predetermined interval and generating an interrupt signal if said one of at least one module fails to execute within said smallest timeout value, said counter loaded with the smallest timeout value associated with one of the other of said at least one module if said one of at least one module executes within said smallest timeout value;

a processor for executing said fail-fast computer program; and an interrupt handler coupled to said processor for generating a reset signal when said interrupt signal is generated.

14. The system of claim 13 wherein the said memory is controlled by a server connected to a network interconnecting said plurality of computers.

15. The system of claim 14 wherein said counter comprises a hardware counter configured to decrement said smallest timeout value, said hardware counter in communication with said fail fast computer program to indicate when said smallest timeout value is decremented to zero, said interrupt handler generating a reset signal when said smallest timeout value is decremented to zero, said hardware counter coupled to said memory.

16. The system of claim 14 wherein said counter comprises a multi-counter hardware device coupled to said memory, said multi-counter hardware device containing multiple hardware counters, each unused said hardware counter assigned to the at least one module capable of initiating said arming operation.

17. The system of claim 14 comprising a first monitor module configured to enable transmission of a heart beat message to a second monitor module of another computer of said plurality of computers to indicate that the computer system is active, said another computer capable of replacing the computer system if said heart beat message indicates to said another computer that the computer system is inactive, said heart beat message capable of indicating that the computer system is inactive if said interrupt handler resets the computer system.

* * * * *